United States Patent
Walz et al.

(10) Patent No.: US 6,669,544 B1
(45) Date of Patent: Dec. 30, 2003

(54) PROTECTIVE HOOD FOR A RIGHT ANGLE GRINDER

(75) Inventors: Roland Walz, Stuttgart (DE); Peter Stierle, Waldenbuch (DE); Ralph Dammertz, Stuttgart (DE); Maria-Margareta Sulea, Leinfelden-Echterdingen (DE); Stefan Heess, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 09/913,552

(22) PCT Filed: Nov. 25, 2000

(86) PCT No.: PCT/DE00/04211

§ 371 (c)(1),
(2), (4) Date: Aug. 15, 2001

(87) PCT Pub. No.: WO01/51253

PCT Pub. Date: Jul. 19, 2001

(30) Foreign Application Priority Data

Jan. 10, 2000 (DE) .......................................... 100 00 701

(51) Int. Cl.⁷ .............................................. B24B 23/02
(52) U.S. Cl. ........................ 451/454; 451/451; 451/452
(58) Field of Search ................................. 451/454, 451, 451/452; 24/68 D, 270–273; 285/242, 365, 409; D8/62

(56) References Cited

U.S. PATENT DOCUMENTS

| | | | | | |
|---|---|---|---|---|---|
| 1,646,463 A | * | 10/1927 | Stokesberry | ................ | 285/409 |
| 2,915,799 A | * | 12/1959 | Andreasen | .................... | 24/270 |
| 3,042,430 A | * | 7/1962 | Guy | ............................ | 285/365 |
| 4,008,937 A | * | 2/1977 | Filippi | ........................ | 439/192 |
| 4,650,221 A | * | 3/1987 | Caillouet, Jr. | ................ | 285/87 |
| 4,891,915 A | * | 1/1990 | Yasuda | ....................... | 451/359 |
| 5,351,368 A | * | 10/1994 | Borst | ........................... | 24/270 |
| 6,464,573 B1 | * | 10/2002 | Keller | ......................... | 451/451 |
| D468,179 S | * | 1/2003 | Hayakawa et al. | ............. | D8/62 |

FOREIGN PATENT DOCUMENTS

| | | |
|---|---|---|
| DE | 22 25 629 A | 12/1973 |
| DE | 31 28 252 A | 9/1982 |
| EP | 0 537 198 B1 | 9/1995 |
| GB | 1 481 136 A | 7/1977 |
| GB | 2 121 135 A | 12/1983 |
| WO | 92 00834 A | 1/1992 |

* cited by examiner

*Primary Examiner*—Joseph J. Hail, III
*Assistant Examiner*—Anthony Ojini
(74) *Attorney, Agent, or Firm*—Michael J. Striker

(57) ABSTRACT

A protective hood (1) for a right-angle grinder having a tightening device, which has a tightening band (4) firmly connected to the protective hood (1) for a right-angle grinder, the two ends (5, 6) of the tightening band being embodied as a first and second eyelet (7, 8), so that they form a first and second abutment (9, 10) and can be connected to one another under tension by means of at least two tightening elements, the first tightening element being a tightening lever (2), which with its first end (15) can be supported in the first eyelet (7) pivotably about a first axis (9a) and which can be brought into a first position in which the tightening device is not tightened, and into a second position in which the tightening device is tightened, becomes capable of being produced at less expense with still high quality by providing that the second tightening element is a spring (3), which can be connected movably to the tightening lever (2), the spring (3) being pivotably supported about a second axis (11) in the tightening lever (2) that does not coincide with but is parallel to the first axis (9a), and the spring (3) can be connected to the second eyelet (8) of the second end (6) of the tightening band (4), and the spring (3), on its end that can be connected to the second eyelet (8), has a straight region that is embodied as parallel to the second abutment (10).

8 Claims, 3 Drawing Sheets

PROTECTIVE HOOD FOR A RIGHT ANGLE GRINDER

BACKGROUND OF THE INVENTION

The Invention is based on a protective hood for a right-angle grinder.

From European Patent Disclosure EP 0 537 198 B1, a protective hood is known that has a tightening device for tight fastening to the clamping neck of a power tool, in particular a right-angle grinder. The tightening device is mounted on a tightening band, which is firmly connected to the protective hood. The ends of the tightening band are each embodied as eyelets. The tightening device comprises a tightening lever and a transmission member, and both the transmission member the tightening lever are each connected to one end of the tightening band in such a way that they are each pivotable about a pivot axis embodied by the eyelets. The transmission member is also supported pivotably in the tightening lever about a further pivot axis, and the three pivot axes are parallel to one another and do not coincide. As a result, in tightening and loosening the tightening device functions like a toggle lever device. By means of such a design, it is possible to replace the protective hood on the clamping neck of the right-angle grinder without using additional tools, such as a screwdriver.

SUMMARY OF THE INVENTION

The protective hood for a right-angle grinder has the advantage over the prior art of a more economical design, and the advantage of the aforementioned prior art, that is, that the protective hood for a right-angle grinder can be removed from the right-angle grinder without using an additional tool, is still possible.

Because the second tightening element is embodied as a spring, it is possible to compensate for production variations in the components of the protective hood for a right-angle grinder. This is made possible to a certain extent by the elasticity of the spring. It is furthermore possible for the tightening band to be bent open or compressed to a greater extent that was possible in the prior art, since the spring used as the second tightening element does not constantly engage the end embodied as the second axis but rather engages it only in the prestressed state and in the tightened state. The protective hood for a right-angle grinder is then firmly connected to a right-angle grinder.

It is advantageous to embody the spring With an undulating form in a direction perpendicular to one of the axes. Production variations in the two ends of the tightening band, which are embodied as eyelets, and in the tightening band can then be well compensated for. If the spring is of wire, then it can be produced especially easily, and compared with a leaflike spring, there is a saving in terms of weight.

Advantageously, the wire is bent such that its ends face one another and are parallel to the second axis and assume the contour of a flat rectangular body. This increases the certainty that the spring will not slip out of the tightening lever.

It is furthermore advantageous if the undulating shape of the spring has different amplitudes, and if the spring has a shape that is symmetrical to a plane of symmetry that is vertical to the second axis. Such springs are simple to produce and because of their symmetry they cooperate especially well with the other elements of the tightening device.

It is also advantageous if the first end of the tightening lever has an eccentric leg, which is embodied eccentrically to the first axis and is associated with a first shoulder of the tightening band in the region of the first eyelet, with which shoulder it can be brought into a contact position to limit the opening angle and as security against unintentionally emerging from the first eyelet.

It is advantageous as well if a lug protrudes past the inside face of the tightening band and/or if a convex curvature is provided on the inside face of the tightening band. On the one hand, this assures axial security against loss of the protective hood for a right-angle grinder, since the lug can engage a groove on the clamping neck. On the other, the convex curvature prevents torsion of the protective hood for a right-angle grinder relative to the clamping neck in the azimuth direction relative to the pivot axis of the work spindle.

It is especially advantageous if the lug and the convex curvature are disposed one above the other in a direction parallel to the first axis. As a result, they can be produced very simply and in only a single operation, for instance by stamping.

Further advantageous features of the invention will become apparent from the dependent claims.

BRIEF DESCRIPTION OF THE DRAWINGS

The invention is explained in further detail in the ensuing description in terms of an exemplary embodiment shown in the drawings. Shown are FIG. 1, a view of an exemplary embodiment of a protective hood for a right-angle grinder, seen from above.

DESCRIPTION OF THE PREFERRED EMBODIMENTS

Figure 1:
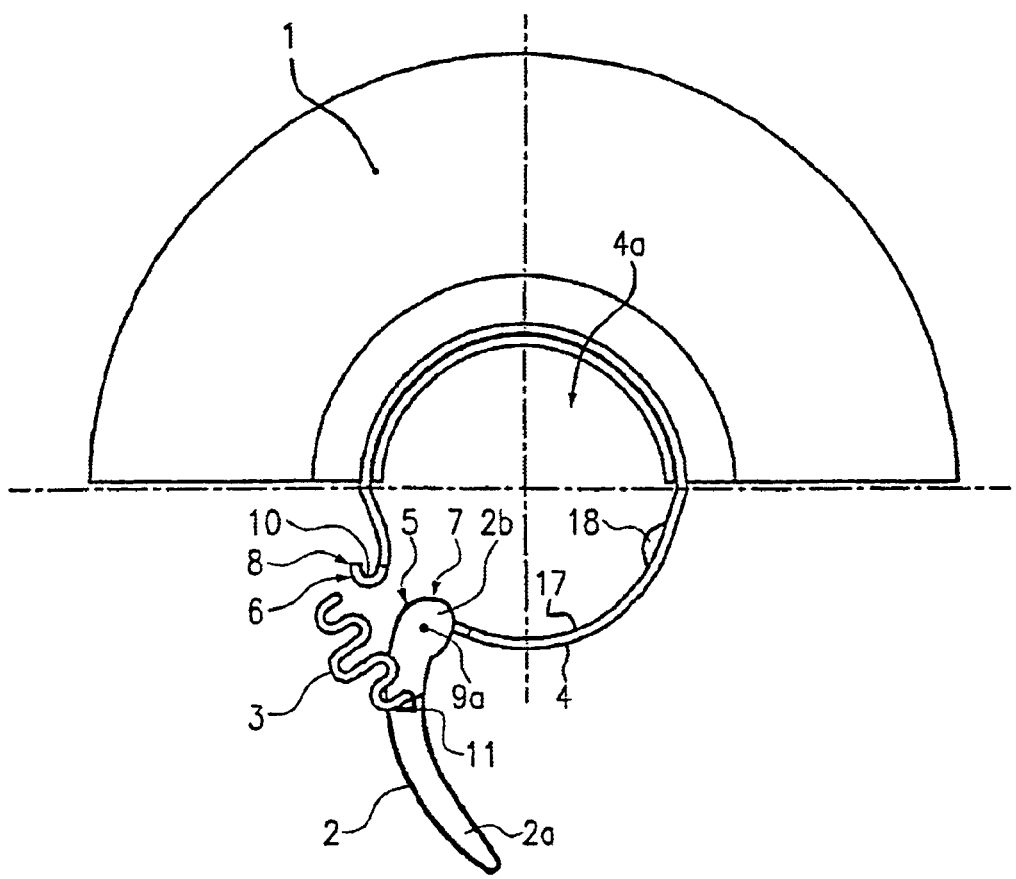

FIG. 1 shows a protective hood 1 for a right-angle grinder, on which a tightening band 4 is mounted. The tightening band 4 is firmly connected to the protective hood 1 for a right-angle grinder, for example by being welded to it. The tightening band 4 has two ends 5, 6, which are embodied as first and second eyelets 7, 8, respectively. A one-armed tightening lever 2 that has a handle 2a is pivotably supported in the first eyelet 7. The tightening lever 2 also has an eccentric leg 2b, which protrudes eccentrically past the first eyelet 7. A spring 3 is pivotably supported in the tightening lever 2 about a second axis 11, which is embodied as parallel to the first axis 9a and does not coincide with it. The tightening lever 2 and spring 3 form a tightening device, by means of which the tightening band 4 can be drawn together. A lug 18 produced preferably by stamping protrudes past the inside face 17 of the tightening band 4.

Figure 2:
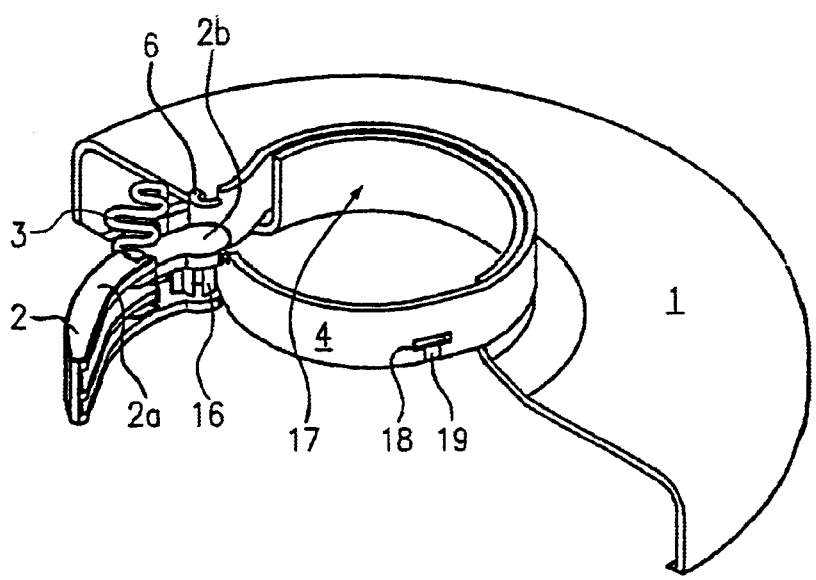
FIG. 2, a perspective view of the protective hood for a right-angle grinder of FIG. 1.

FIG. 2 shows a perspective view of the subject of FIG. 1; as an additional characteristic, not visible in FIG. 1, a radially inward-pointing convex curvature 19 can be seen on the tightening band 4. This convex curvature 19 is located below the lug 18. For further details of these two elements, preferably made in the same stamping operation, see the description of FIGS. 7 and 8.

The protective hood 1 for a right-angle grinder is shipped in a preassembled state. In that state, the free end of the spring 3, that is, the end not connected to the tightening lever 2, is already suspended from the second eyelet 8. After the spring 3 was suspended in place, the second eyelet 8 was compressed, so that the spring 3 can no longer slip out of the second eyelet 8. As a result, an opening 4a is formed by the tightening band 4, the tightening lever 2 and the spring 3 suspended in the second eyelet 8. This opening 4a can no longer be bent open, in its diameter, beyond a certain 1predetermined value. This prevents the protective hood 1 for a right-angle grinder from being able to be set onto a right-angle grinder for which the hood, because of its size, is not intended.

The mounting of the above-described protective hood 1 for a right-angle grinder on a right-angle grinder (not shown) proceeds such that the opening 4a formed by the tightening device 4 is slipped onto a clamping neck (not shown) of the right-angle grinder, so that the lug 18 protrudes into an annular groove (not shown) embodied on the clamping neck. Then the tightening lever 2 is pivoted about the first axis 9a, which is embodied by an axial bolt 16, away from the tightening band 4, so that the spring 3, pivoting about the second eyelet 8 of the tightening band 4, follows the motion of the tightening lever 2. In the process, the spring 3, with a straight region 3a (see FIGS. 4 and 5) that serves as an axis, engages the second eyelet 8 and is pivoted about the second axis 11 in the tightening lever 2. If the tightening lever 2 is then pivoted back toward the tightening band 4, the region 3a of the spring precesses against the second abutment 10. In this position, the tightening device is in its prestressed state. The tightening lever 2 is then pivoted farther in the direction of the tightening band 4, so that the two ends 5, 6 of the tightening band 4 are drawn together by the tightening device, acting as a toggle lever, comprising the tightening lever 2 and the spring 3. This decreases the diameter of the opening 4a in the tightening band 4, and the lug 18 engages the radial groove in the clamping neck of the right-angle grinder. The tension of the tightening band 4 around the clamping neck is Increased steadily in the tightening process, so that the tightening band 4 is pressed so hard against the damping neck that a connection between the right-angle grinder and the protective hood 1 for a right-angle grinder that is secure against relative rotation is assured. The tightening device embodied as a toggle lever system does not come loose on its own, either, because of the tension in the tightening band 4, since the tightening lever 2 in the process of tightening the tightening band 4 moves past a dead center point beyond which a radial force relative to the opening 4a must be exerted to make the tightening lever 2 move past this dead center point again in order to loosen the tightening band 4. The dead center point is reached when the second abutment 10, the first axis 9a and the second axis 11 are located in the same plane.

Removing the protective hood 1 for a right-angle grinder from the right-angle grinder is done in reverse order from mounting it. As a result, it is possible without using a tool, such as a screwdriver, to connect the protective hood 1 for a right-angle grinder securely and reliably to a right-angle grinder.

The tightening device comprising the tightening lever 2 and spring 3 as well as the tightening band 4 are adapted to the particular size of clamping neck. By the use of the spring 3, it is advantageously possible to compensate for production variations both in the tightening band, for instance in terms of the design of the two eyelets 7, 8 located on its ends 5, 6, and in the tightening device, that is, the tightening lever 2, for instance with regard to its two axes 9a, 11, and in the spring 3 itself. As a result, such a protective hood 1 for a right-angle grinder can be produced very inexpensively and simply.

Figure 3:
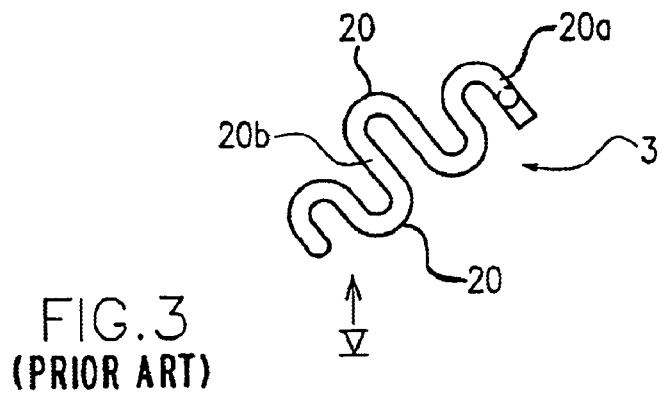
FIG. 3, a spring, seen from the same direction as in FIG. 1.

FIG. 3 shows the undulating shape of the spring 3. The undulating shape has undulation crests and troughs 20, which are joined to one another via legs 20a, 20b. The undulations thus formed extend in a plane that is vertical to the first axis 9a and the second axis 11 and that is represented in FIG. 3 by the plane of the drawing. The spring 3 shown has five crests and troughs 20, but this is in no way limiting, since a greater or lesser number of crests and troughs 20 can equally well be employed. The undulation crests and troughs 20 each have the same radius of curvature. Once again, this is merely one special design which is in no way limiting. The amplitude of the undulations varies, so that the middle undulation has a greater amplitude than the other undulations. This is achieved by means of legs 20a, 20b of different lengths. Once again, this special design is not in any way to be considered limiting, since it is equally possible for all the amplitudes to be embodied as equal, or to provide more than two different amplitudes for the undulations.

Figure 4:
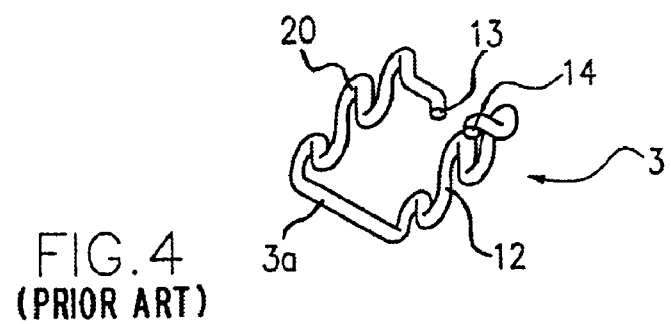
FIG. 4, a perspective view of the spring of FIG. 3.

In FIG. 4, it can be seen that the spring 3 is formed from a wire 12, in particular a spring steel wire. The wire 12 is bent symmetrically to a plane of symmetry S (see FIG. 5), which is embodied parallel to the undulation crests 20. The two undulating parts of the spring 3, which are embodied symmetrically to one another, are joined together at one end of the spring via the straight region 3a. The other end of the spring 3 is open, and the two ends 13, 14 of the wire 12 are bent such that they face one another and are oriented parallel to the two undulating parts of the spring 3. At the same time, they are thus vertical to the straight region 3a. When the spring 3 is inserted into the tightening lever 2, then the straight region 3a is parallel to the second axis 11, about which the spring 3 is pivotably supported in the tightening lever 2, and the two ends 13, 14 of the spring 3 are then vertical to the axis 11.

Figure 5:
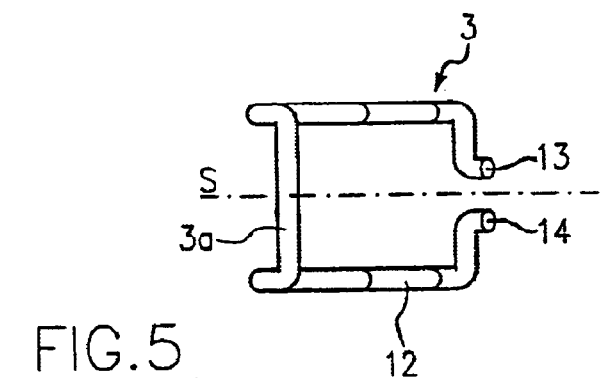
FIG. 5, a view of the spring from the direction marked V in FIG. 3.

In FIG. 5, it can be seen how the two ends 13, 14 of the spring 3 are embodied parallel to the plane of symmetry S and face one another. This design of the two ends 13, 14 of the spring 3 assures that in its state in which it is inserted into an opening 21 (see FIG. 6) in the tightening lever 2, and when it is prestressed as described above, the spring 3 cannot slip out of the opening 21 in the tightening lever 2. This is especially advantageous whenever the tightening lever 2 snaps open, because it prevents the spring 3 from coming loose from the tightening lever and dropping to the floor and being lost. It can also be seen that the straight region 3a is perpendicular to the plane of symmetry S. By the design of the straight region 3a parallel to the second axis 11 and thus also to the second abutment 10 of the second eyelet 8 of the second end 6 of the tightening band 4, it is assured that in tightening the tightening device, this straight region 3a will rest with an accurate fit on the abutment 10, and thus secure tightening of the tightening band 4 can take place.

Figure 6:
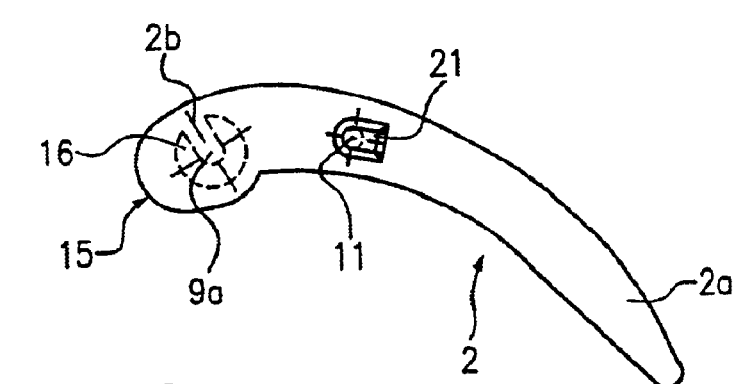
FIG. 6, a view of the tightening lever on a larger scale, seen from the same direction as in FIG. 1.

In FIG. 6, the tightening lever 2 is shown on a larger scale. On its first end 15, on which it can be connected to the first end 5 of the tightening band 4, the tightening lever 2 has the axial bolt 16, which is embodied such that it extends parallel to the first axis 9a when the tightening lever 2 is pivotably supported in the first abutment 9 of the first eyelet 7.

In addition, on its side remote from the handle 2a, the tightening lever 2 has the longitudinally protruding eccentric leg 2b. This leg 2b, in its mounted state in the first eyelet 7, protrudes eccentrically past the first axis 9a. The tightening lever 2 has a U-shaped cross section, and the two legs of the U between them grip the face ends of the tightening band 2 in the region of the first eyelet 7. The eccentric leg 2b, as the tightening lever 2 opens, comes to a stop against a first shoulder 22 (see FIGS. 7 and 9), so that as a result, both further opening and the possibility that the tightening lever 2 will be forced out of the eyelet 7 are precluded. It is thus attained that in the open state, the tightening lever 2 is secured against falling out of the first eyelet 7 of the tightening band 4.

The aforementioned opening 21 in the body of the tightening lever 2, into which the spring 3 is inserted., can also be seen. The second axis 11, which is not physically present, about which the spring can be pivoted in its state in which it has been inserted into the tightening lever 2, is located inside this opening 21. The second axis 11 is embodied parallel to the first axis 9a.

Figure 7:
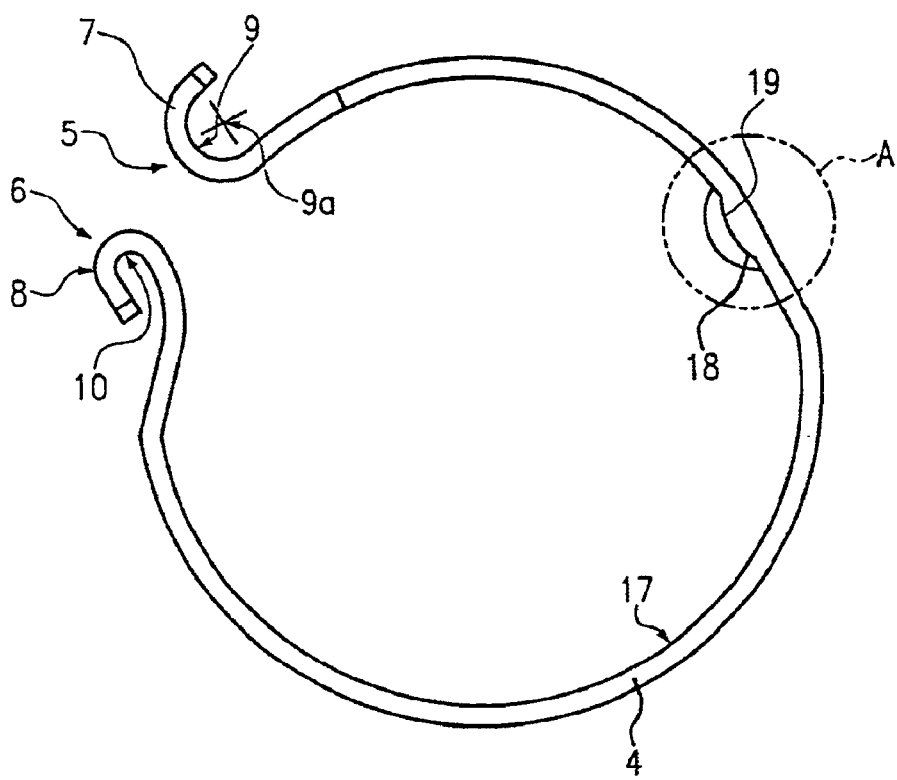
FIG. 7, a view of the enlarged tightening band on a larger scale, seen from the opposite direction from FIG. 1.
Figure 8:
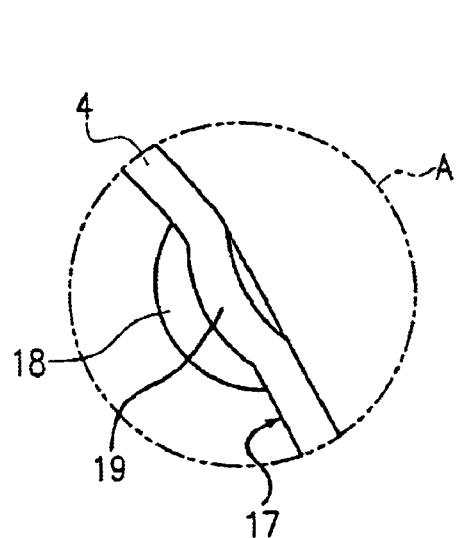
FIG. 8, an enlarged detail of the tightening band of FIG. 7.

FIG. 7 shows the tightening band 4 viewed from the opposite direction from FIG. 1. The embodiments of the two ends 5, 6 of the tightening band 4 will not be addressed further here, because this has already been described above in conjunction with FIGS. 1 and 2. The lug 18 and the convex curvature 19, which protrude past the side face 17 of the tightening band 4, can be seen clearly. These two features are shown even more clearly in FIG. 8, which is an enlargement of the detail A of FIG. 7. The lug 18 serves to prevent the protective hood 1 for a right-angle grinder from being able to slide axially along the clamping neck. Conversely, the convex curvature 19 serves to prevent torsion of the protective hood 1 for a right-angle grinder in the azimuth direction relative to the pivot axis of the right-angle grinder, by means of a greater contact pressure of the tightening band 4 against the clamping neck. The two elements, that is, the lug 18 and the convex curvature 19, are disposed one above the other, in alignment, in an axis that is parallel to the first axis 9a.

Figure 9:
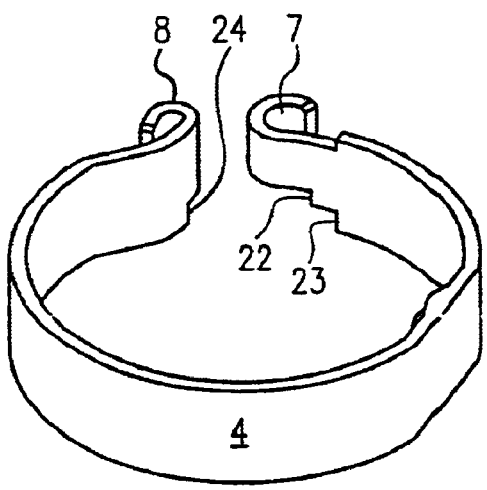
FIG. 9, a perspective view of the tightening band of FIG. 7.

In FIG. 9, the first shoulder 22 on the tightening band 4, described in conjunction with FIG. 6, is shown. For its function, see the description of FIG. 6. A second shoulder 23 is also embodied on the tightening band, in the region of the first shoulder 22 and parallel to it. On the other end of the tightening band 4, adjacent to the second eyelet 8, a third shoulder 24 is formed, also oriented parallel to the first shoulder 22 and the second shoulder 23. The second shoulder 23 and the third shoulder 24 serve to allow the spring 3 to pass freely through during the operations of tightening and loosening as the protective hood 1 for a right-angle grinder is mounted on a right-angle grinder.

What is claimed is:

1. A protective hood (1) for a right-angle grinder having a tightening device, which has a tightening band (4) firmly connected to the protective hood (1) for a right-angle grinder, the two ends (5, 6) of the tightening band being embodied as a first and second eyelet (7, 8), so that they form a first and second abutment (9, 10) and can be connected to one another under tension by means of at least two tightening elements, the first tightening element being a tightening lever (2), which with its first end (15) can be supported in the first eyelet (7) pivotably about a first axis (9a) and which can be brought into a first position in which the tightening device is not tightened, and into a second position in which the tightening device is tightened, characterized in that the second tightening element is a spring (3), which can be connected movably to the tightening lever (2), the spring (3) being pivotably supported about a second axis (11) in the tightening lever (2) that does not coincide with but is parallel to the first axis (9a), and the spring (3) can be connected to the second eyelet (8) of the second end (6) of the tightening band (4), and the spring (3), on its end that can be connected to the second eyelet (8), has a straight region that is embodied as parallel to the second abutment (10).

2. The protective hood (1) for a right-angle grinder of claim 1, characterized in that the spring (3) is embodied in undulating fashion in a direction perpendicular to one of the axes (9a, 11).

3. The protective hood (1) for a right-angle grinder of claim 1, characterized in that the spring (3) is of wire (12).

4. The protective hood (1) for a right-angle grinder of claim 2, characterized in that the wire (12) is bent such that its ends (13, 14) face one another and are parallel to the second axis (11) and assume the contour of a flat rectangular body.

5. The protective hood (1) for a right-angle grinder of claim 2, characterized in that the undulating shape of the spring (3) has different amplitudes.

6. The protective hood (1) for a right-angle grinder of claim 1, characterized in that the spring has a shape that is symmetrical to a plane of symmetry (S) that is vertical to the second axis (11).

7. The protective hood (1) for a right-angle grinder of claim 1, characterized in that a lug (18) protrudes past the inside face (17) of the tightening band (4) and/or that a convex curvature (19) is provided on the inside face (17) of the tightening band (4).

8. The protective hood (1) for a right-angle grinder of claim 1, characterized in that the lug (18) and the convex curvature (19) are disposed one above the other in a direction parallel to the first axis (9a).

* * * * *